US 6,593,540 B1

(12) United States Patent
Baker et al.

(10) Patent No.: US 6,593,540 B1
(45) Date of Patent: Jul. 15, 2003

(54) HAND HELD POWDER-FED LASER FUSION WELDING TORCH

(75) Inventors: Martin C. Baker, Budd Lake, NJ (US); Santosh K. Das, Randolph, NJ (US); Richard F. Haraz, Alpharetta, GA (US); William F. Hehmann, Greer, SC (US); Vincent J. Papotto, Winder, GA (US); Federico Renteria, Greenville, SC (US); Gary Winchester, Duluth, GA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/071,025

(22) Filed: Feb. 8, 2002

(51) Int. Cl.⁷ .............................................. B23K 26/20
(52) U.S. Cl. ................................................. 219/121.63
(58) Field of Search ....................... 219/121.63, 121.64, 219/121.65, 121.66, 121.6; 228/54

(56) References Cited

U.S. PATENT DOCUMENTS

| 2,851,581 | A | * | 9/1958 | Libby ........................... 219/74 |
| 4,237,364 | A | * | 12/1980 | Lemelson ............... 219/121.63 |
| 4,564,736 | A | | 1/1986 | Jones et al. ............... 219/121.6 |
| 4,665,529 | A | | 5/1987 | Baer et al. .................. 372/107 |
| 4,676,586 | A | | 6/1987 | Jones et al. ................... 385/33 |
| 4,704,030 | A | | 11/1987 | Steen et al. ................. 356/121 |
| 4,724,299 | A | | 2/1988 | Hammeke .................... 219/121 |
| 4,726,715 | A | | 2/1988 | Steen et al. .................... 406/55 |
| 4,777,341 | A | | 10/1988 | Steen et al. ............. 219/121.83 |
| 4,803,335 | A | | 2/1989 | Steen et al. ............. 219/121.84 |
| 4,804,815 | A | | 2/1989 | Everett ..................... 219/121.6 |
| 4,814,575 | A | | 3/1989 | Petitbon .................. 219/121.64 |
| 4,906,812 | A | | 3/1990 | Nied et al. .............. 219/121.63 |
| 4,997,250 | A | | 3/1991 | Ortiz, Jr. .................. 350/96.18 |
| 5,272,716 | A | | 12/1993 | Soltz et al. ................... 372/109 |
| 5,365,032 | A | | 11/1994 | Muller et al. ........... 219/121.67 |
| 5,453,329 | A | | 9/1995 | Everett et al. ............... 428/565 |
| 5,477,025 | A | | 12/1995 | Everett et al. ......... 219/121.84 |
| 5,548,604 | A | * | 8/1996 | Toepel .......................... 372/35 |
| 5,556,560 | A | | 9/1996 | Ahola et al. ........... 219/121.45 |
| 5,653,381 | A | | 8/1997 | Azdasht ....................... 228/254 |
| 5,760,362 | A | | 6/1998 | Eloy ........................ 219/121.6 |
| 5,993,550 | A | | 11/1999 | Eloy ........................... 118/308 |
| 6,369,353 | B1 | * | 4/2002 | Soska ..................... 219/121.68 |

FOREIGN PATENT DOCUMENTS

JP 9-323185 * 12/1997

* cited by examiner

Primary Examiner—Tom Dunn
Assistant Examiner—Jonathan Johnson
(74) Attorney, Agent, or Firm—Keith A. Newburry, Esq.

(57) ABSTRACT

A novel and inventive hand held powder-fed laser fusion welding torch providing manual flexibility for laser welding with powder-fed material. The hand held laser includes a body, handle, and nozzle assembly. The nozzle may be shrouded by a cover that is slightly spaced apart from the nozzle. The gap between the two may provide space through which inert gas may flow. Laser light from a remote source shines through the nozzle's central aperture. The nozzle aperture may be circumscribed by powder channel outlets aligned upon a working focal point coincident with the laser beam to treat a workpiece. A proximity sensor may enable selective welding torch operation according to the presence of a workpiece.

19 Claims, 5 Drawing Sheets

HAND HELD POWDER-FED LASER FUSION WELDING TORCH

BACKGROUND OF THE INVENTION

1. Field of the Invention

This invention relates to laser fusion welding and more particularly to a hand held powder-fed laser fusion welding torch.

2. Description of the Related Art

In general, the surface of a metallic article may be welded and/or alloyed by the simultaneous and cooperative operation of a laser beam and an alloy powder stream. To accomplish this, systems exist that have a laser source and focusing apparatus, with a powder delivery apparatus provided as part of an integral package. The laser beam melts a relatively small area at the surface of the article, and a controlled volume of alloying particles are delivered into the melt pool via the powder flow stream.

In laser fusion welding, an article of metal or other material may have the surface thereof alloyed, or otherwise treated, by the simultaneous and cooperative operation of a laser beam with an alloy powder. Typically, the laser beam melts a relatively small volume of the outer surface of the article and the powder system delivers a controlled volume of alloying particles into this molten volume. The alloying particles become dispersed throughout this volume and therewith alter, complement, or add to the composition of the outer layer in a controllable way. Removal of the beam, such as by advancement of the workpiece relative to the focal point of the beam, causes the molten volume to be rapidly chilled. The chilling occurs so rapidly that the volume retains the characteristics of the molten mix.

As an example, gas turbine engines, such as those utilized with jet aircraft, are being designed with ever increasing performance requirements. One element of the engine which has been receiving attention is the seal created between the outer periphery of the rapidly rotating blades and the surrounding housing. Another element subject to attention is the turbine nozzle system in jet engines.

The owner of the present invention, Honeywell International, Inc., often repairs turbine nozzles with a process called JetFix. The JetFix process uses steps as follows: chemically and mechanically stripping the outer aluminide coating, welding the cracks, thermally shocking the welds (to form micro cracks), fluoride ion cleaning of the cracks, (to remove oxides), applying a JetFix braze alloy, vacuum furnace brazing, blending brazing, re-application of aluminide coating, and effective flow area check.

Laser powder fusion (LPF) technology has been in use for the past twelve years and has demonstrated the benefits of small heat affected zones on turbine airfoils. Some repair facilities, such as those at Honeywell International Inc., have successfully repaired over 500,000 airfoils which have subsequently accumulated over 10 million flight hours. However, commercially available LPF machines are relatively large and usually run along pre-programmed paths for the repair of a specific part. Thus, one limitation of LPF is the inability of the user to manipulate the laser torch in a custom manner during the repair process as the weld occurs. Accordingly, there is a need for an LPF apparatus that can allow the user to tailor the weld and welding process to the workpiece as the laser is being operated. The present invention satisfies this need.

SUMMARY OF THE INVENTION

The present invention provides a hand-held powder-fed laser fusion welding torch that allows customized welding by delivery of laser light onto a stream of welding fusion powder. The ability to provide such a compact laser welding system increases convenience and flexibility, enabling the welder to create or repair objects with greater skill, flexibility, and efficiency.

Worn or damaged metal parts and assemblies may be repaired or dimensionally restored through high power laser processing with a laser source of sufficient intensity to melt so the metal surface while a metallic filler in the form of a powder, wire or rod is introduced into the melt pool. Metallic precursors in a liquid or semi-liquid form may also be applied to the surface, allowed to dry, and then laser processed. In situations where the work surface is not accessible by conventional workstation type of laser powder metal fusion equipment, a compact hand-held torch is preferred. Other cases may involve the repair of parts having irregular and random cracks or damage not otherwise repairable by robotic or programmable workstations. In order to perform repairs of this type, a portable, flexible delivery system is, required for both laser as well as the metal filler. This invention provides for these needs through the integration of laser beam and metal powder delivery components into a single compact hand-held unit. The laser source may be a continuous wave Nd:YAG laser.

In one embodiment, the hand held laser includes a body and a nozzle assembly mounted on the body, with the nozzle assembly defining a central nozzle aperture through which gas and light including laser light may pass. The nozzle defines first and second powder flow channels aligned with a working focal point adjacent the central nozzle aperture. Fusion powder may be transmitted through the first and second powder flow channels for fusing by laser light transmitted through the central nozzle aperture.

In another embodiment, a method is provided to manually laser powder fusion weld a workpiece in order to effect construction and/or repair. A hand held powder-fed laser fusion welding torch is provided that may be manually operated. In such manual operation, the torch generally enjoys significant degrees of spatial freedom so that the welder may dispose the torch in a variety and number of easily-achieved positions. In this way, the welder may conform his activities to the needs at hand and is preferably not limited by physical constraints of the laser torch.

Other features and advantages of the present invention will become apparent from the following description of the preferred embodiment(s), taken in conjunction with the accompanying drawings, which illustrate, by way of example, the principles of the invention.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

An alternative and less costly or intrusive process uses a hand-held laser powder fusion (LPF) torch could repair the turbine nozzle cracks by local removal of the coating and crack, laser powder fusion welding, blending and local touch up of the aluminide coating. The advantages of LPF welding are the low heat input and resultant heat affected zone which allows welding on turbine nozzles where previously it was not permitted.

Worn or damaged metal parts and assemblies may be repaired or dimensionally restored through high power laser processing with a laser source of sufficient intensity to melt the metal surface while a metallic filler in the form of a powder, wire or rod is introduced into the melt pool. Metallic precursors in a liquid or semi-liquid form may also be applied to the surface, allowed to dry, and then laser processed. In situations where the work surface is not accessible by conventional workstation type of laser powder metal fusion equipment, a compact hand-held torch is preferred. Other cases may involve the repair of parts having irregular and random cracks or damage not otherwise repairable by robotic or programmable workstations. In order to perform repairs of this type, a portable, flexible delivery system is required for both laser as well as the metal filler. This invention provides for these needs through the integration of laser beam and metal powder delivery components into a single compact hand-held unit. Currently, the preferred laser source is a continuous wave Nd:YAG laser, of medium to high power (e.g., 600–1000 watts), capable of melting a variety of metals when focused to a spot at the work surface. In a YAG (Nd:YAG) laser, the amplifying medium is a rod of yttrium aluminum garnet (YAG) containing ions of the lanthanide metal neodymium (Nd). Other laser and/or powder feed sources may be used, as required for particular applications.

The Nd:YAG laser is used, because:
1) The one point zero six micrometer (1.06 $\mu$m) fundamental characteristic wavelength of Nd:YAG lasers is readily transmitted through flexible silica fiber optic cables;
2) The beam spatial characteristics are favorable for focusing by simple lenses to produce spot sizes on the order of one millimeter (1 mm) diameter with sufficient power density and uniformity required to melt metal alloys commonly used in jet engine applications; and
3) The Nd:YAG laser fundamental wavelength is readily absorbed by the host metal, enabling melting of the metal at lower laser power settings.

A fiber optic delivery system permits the laser source to be located remotely from the hand-held laser welding torch, as required for hand manipulation.

The laser torch is comprised of an optical system to, focus the laser beam onto the workpiece, and an integral metal powder delivery nozzle to deposit metal alloy powder into the metal melt pool produced by the focused laser radiation. The torch assembly is optically coupled to the laser source through the flexible fiber optic light cable. Laser energy emitted by the source is transmitted through the fiber cable to collimating and focusing optics contained within the torch housing. The focal spot size is selected to produce the desired melting of the base material at the lowest possible laser, output power. Melt pool diameter, depth of penetration, heat affected zone (HAZ) dimensions and weld rate are closely related to the laser focal spot diameter and total laser output power. Good results have been achieved with one millimeter (1 mm) diameter spot sizes with six hundred watts (600 W) of laser output power. Variations in the base metal characteristics and desired weld rate may require different spot size and laser power settings. The spot size and working focal distance are adjusted by choosing different combinations of collimating and focusing lenses. The torch assembly can be disassembled in sections to facilitate lens changes. Laser power is adjusted by varying the power output setting of the laser source.

Metal powder is introduced into the weld zone through one or more nozzles contained within or attached to the laser torch. In one embodiment, the powder nozzles are coaxial with the optical beam path. This arrangement is more compact and provides better access to the workpiece than an offset nozzle design. Greater flexibility in manipulating the torch is also provided by the coaxial design. A separate, hand-held off-axis powder delivery nozzle or nozzles, not attached to the laser torch, may also be employed. Size, weight, balance and ergonomic features are incorporated to provide for manual control and manipulation. An integrated, optionally or selectably removable, handle is included for enhanced controllability. Removable, interchangeable powder delivery nozzle tips may accommodate working distances ranging from one-quarter inch to 3 inches (0.25" to 3").

Metal powder is metered at a preset flow rate from a remote feeder/hopper unit to the nozzle assembly via flexible tubing. The flow can be started and stopped by the operator through a remote control. One or more integral safety sensor devices may actively monitor the proximity and orientation of the torch with respect to the workpiece during operation, thus preventing accidental or unintentional activation.

An alternate design may have one or more offset nozzles attached to the optical focusing assembly. The angle and relationship of the offset nozzles may be adjusted to provide the desired placement of metal powder with respect to the laser focal spot.

Figure 1:
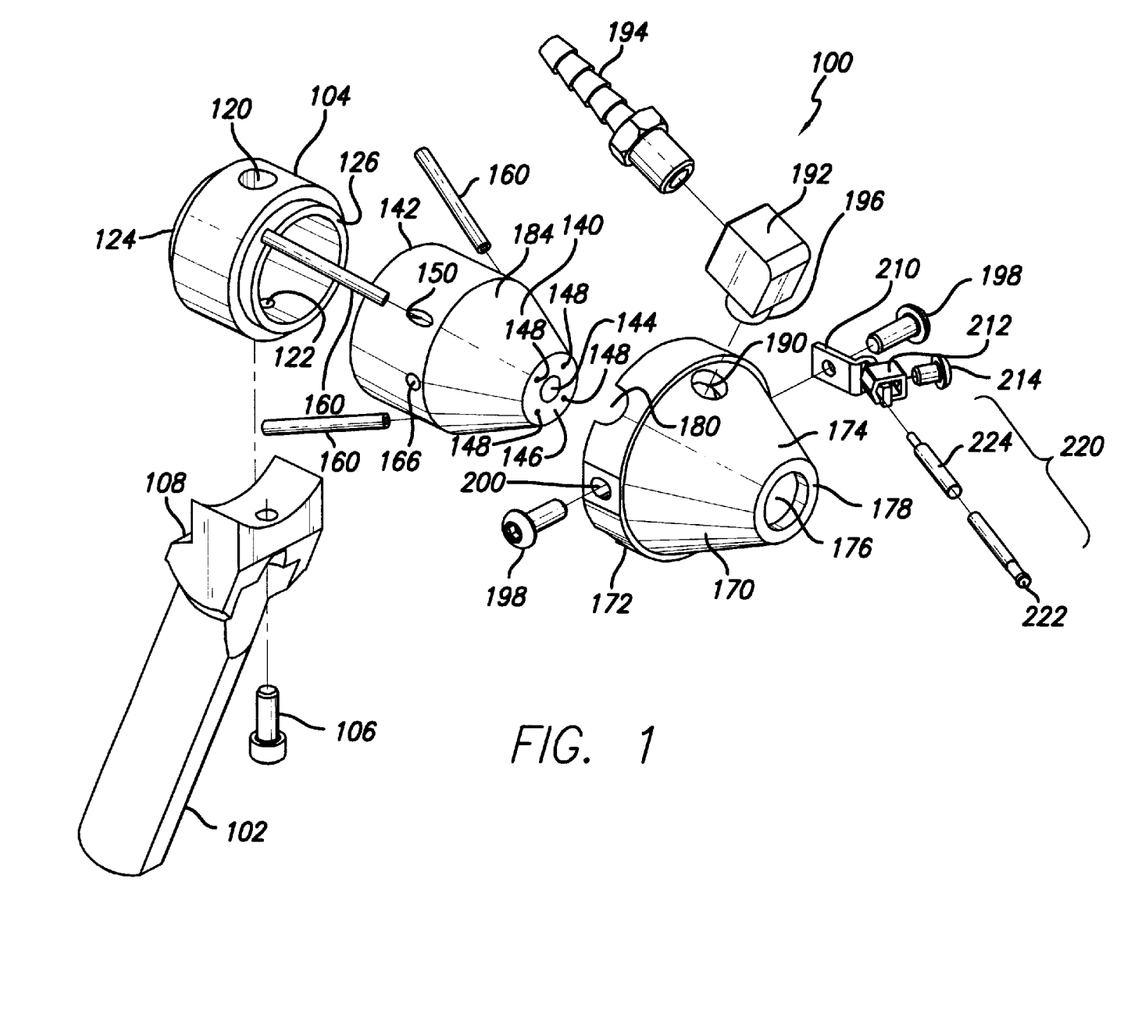
FIG. 1 is a right side perspective and exploded view of the hand held powder-fed laser fusion welding torch assembly according to the present invention.

As shown in FIG. 1, the Hand Held Powder-Fed Laser Fusion Welding Torch 100 has an optional handle 102 to which a body 104 is attached by a pin, screw, bolt, rivet 106, or other fastener which passes through the upper portion 108 of the handle 102. The upper part 108 of the handle 102 is constructed so as to accommodate the cylindrical configuration of the body 104.

The body 104 has a lens protector to its rear as described in more detail below and provides an interchangeable element to which the nozzle 140 and the beam delivery assembly 130 as well as the handle 102 may be attached in an interchangeable and convenient fashion. The upper aperture 120 serves as an inlet through which bleed gas may flow into the torch 100 and provide a generally inert environment through which the laser light may travel and in order to prevent oxidation or other chemical reaction by the laser light. Additionally, the inert gas may provide an optically predictable environment through which the laser light may travel. Additionally, the bleed gas flowing through the upper aperture 120 serves to prevent and inhibit the entry of a dust or other particulate matter into the torch 100, particularly the nozzle 140 or other confines thereof.

The inert gas may be the same as that described in more detail below with respect to the nozzle gas cover 170 and generally encompasses most or all inert gases depending on the applications to which the torch 100 is put. Such inert gases include helium, argon, and nitrogen. While the flow rate for the gas flowing through the nozzle gas cover 170 is on the order of liters per minute (1/m), the volume of gas flowing through the upper aperture 120 is generally on the order of cubic feet per hour, for example four cubic feet per hour.

The handle 102 may be detached from the body 104 in order to create a handle less torch 100. Under any circumstances, the operator of the torch must normally use welding gloves or the like in order to protect his or her hand from ejecta and other material from the welding site. This ejecta from the welding site is one of the motivations for the bleed gas flowing through the upper aperture 120. The bleed gas generally inhibits or prevents the entry of such ejector back into the torch 100.

The lower body aperture 122 serves to accommodate the pin or screw 106, which passes through both the handle 102 and the body 104 in order to attach the body 104 to the handle 102.

The body 104 has threaded rear 124 and front 126 flanges. The flange may be threaded for attachment. The rear flange allows for more secure fixation of the beam delivery assembly 130, which is shown in cross-sectional detail in FIG. 2. The front-flange 126 serves to allow better fixed engagement between the body 104 and the nozzle 140. The adapter body 104 may have other means by which it can be attached to the different elements of the torch.

The size and the shape or the length and diameter of the adapter body 104, may be sized and/or dimensioned according to the optical or other characteristics desired in the laser torch 100. If additional length is needed to accommodate the nozzle 140 or other structure, the adapter body 104 may be lengthened in order to accommodate a more distant focal length, for example. Additionally, the diameter of the adapter body 104 may also be adjusted according to operating characteristics of the torch 100.

Furthermore, in an alternative embodiment, the torch 100 may be constructed in a combined fashion so that all components are in a single integrated unit. However, this static configuration does not lend itself to adaptability that may be necessary for different operations or tasks. Consequently, it is seen as being more advantageous to provide a component-element structure to the laser torch 100 so that different operating elements may be dismantled or disconnected from the others in order to provide easier maintenance, interchangeability, and adjustability. Generally, with the optical characteristics, the gas flow characteristics, and the powder flow characteristics, it is not possible to provide immediate selectable adjustment for these different facets or operations. Consequently, separate parts must generally be independently machined in order to provide the structure or architecture necessary for providing different operating characteristics. This includes, for example, the diameter of the adapter body 104 or the angle at which the powder flows into and through the nozzle 140.

The nozzle 140 is generally hollow in its interior mediating the wide opening at its rear 142 to the narrow front opening 144. The rear portion of the nozzle 140 is generally cylindrical in nature, while the front portion is generally frustro-conicular with a flat front face 146.

Figures 3, 8:
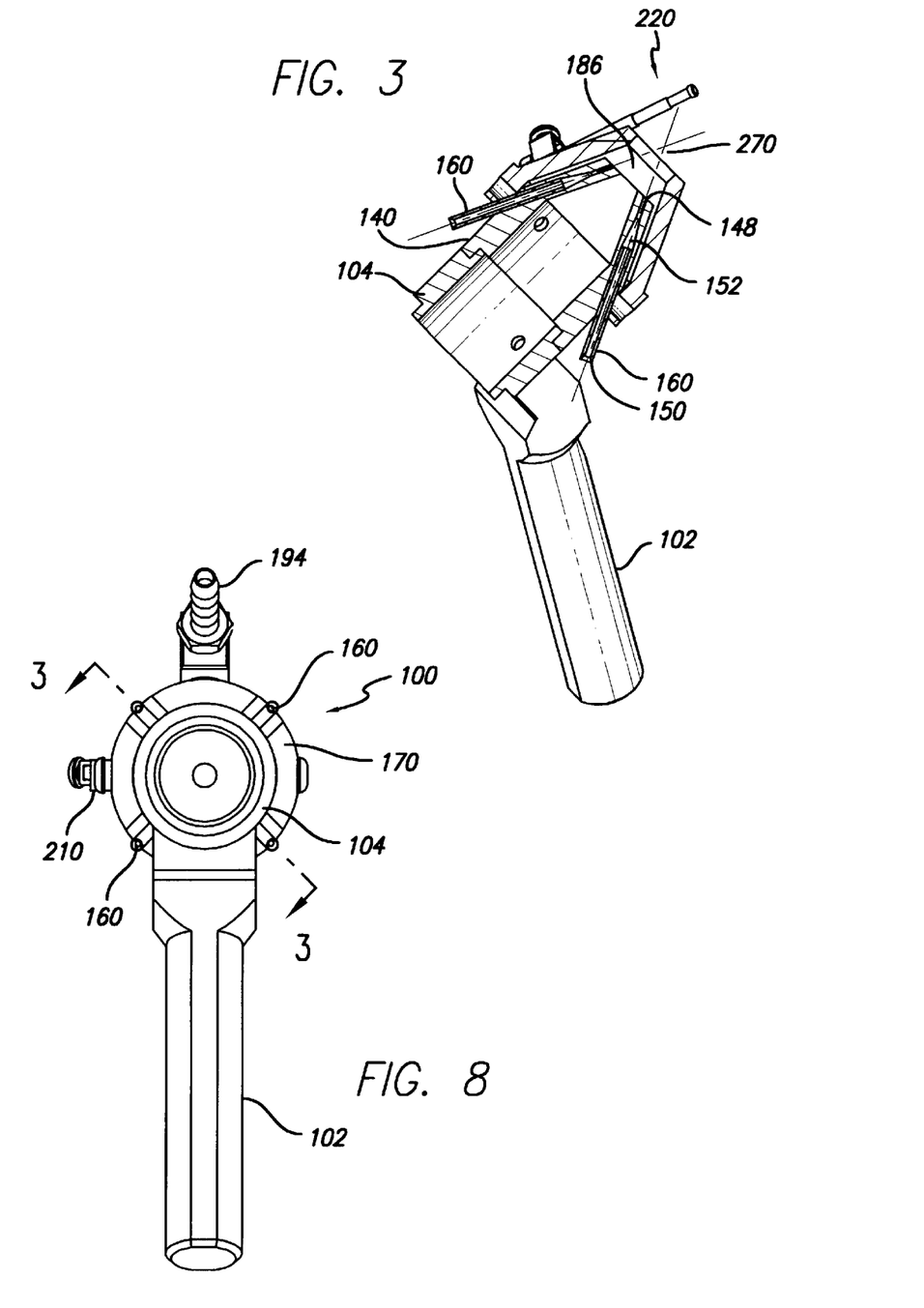
FIG. 3 is a right side top and partial cross-sectional view of the hand held powder-fed laser fusion welding torch of FIG. 1 taken along line 3–3 of FIG. 8.
FIG. 8 is a rear plan view of the hand held powder-fed laser fusion welding torch of FIG. 1.

The face 146 of the nozzle 140 is perforated by four powder flow apertures 148. The powder flow apertures 148 travel backwards through the body of the nozzle 140 until exiting out the cylindrical rear portion at rear powder flow apertures 150. As shown in FIG. 3, the powder flow channel 152 intermediating the distance between the rear 150 and front 148 powder flow openings is initially cylindrical and then tapers to mediate the narrowing diameter between that of the wider rear portion of the channel 152 to the narrow front diameter until the gas channel exits out through the front powder flow aperture 148 and the face 146.

Each powder flow channel has inserted into its rear portion through the rear powder flow aperture 150 a powder flow tube 160 that may be made of copper. The powder flow Ad tubes 160 are introduced into the powder flow channel 152 through the rear powder flow apertures 150 in order to provide means of connection for powder flow lines (not shown) that supply fusion powder to the welding torch 100 via the powder's forced exit out of the front apertures 148. The powder flow tubes 160 converge to a powder feed focal point which allows the converging powder flow streams to mix, preferably outside the nozzle gas cover 170.

Also shown in the nozzle 140 is one of two connection holes 166 that allow a pin, rivet, screw or button to secure the nozzle gas cover 170 to the nozzle 140.

The nozzle gas cover 170 is generally frustro-conicular in shape having a cylindrical rear margin 172 that is dominated by the front frustro-conicular section 174. The front section is truncated and has a central front aperture 176 surrounded by a flat toroidal section 178 of the interior. The interior of the nozzle gas cover 170 is generally hollow in order to accommodate the front frustro-conicular section 184 of the nozzle 140.

Along the rear cylindrical margin 172 are intruding indentations 180, which serve to accommodate the protruding rear ends of the powder flow tubes 160 as they project out from the powder flow channels 152.

Generally, there is a snug fit between the margin 172 of the nozzle gas cover 170 and the area adjacent the rear powder channel apertures 150 in the area just before the front tapered frustro-conicular portion 184 of the nozzle 140, where the transition occurs between the cylindrical section and the tapered section. This helps to provide a rear seal between the nozzle 140 and the nozzle gas cover 170.

The nozzle 140 and the nozzle gas cover 170 are slightly offset and spaced apart to allow gas flow between the exterior of the front section 184 of the nozzle 140 and the interior of the front frustro-conicular section 174 of the nozzle gas cover 170. As shown in FIG. 3, the front aperture 176 of the nozzle gas cover 170 is also spaced apart from the nozzle face 146 in order to provide a plenum area 186 into which gas may be introduced as described in more detail below.

The nozzle gas cover 170 has a gas aperture 190 into which fits a male-to-female right angle pipe adapter 192. A barb-to-pipe conduit 194 fits into the female section of the male-to-female adapter 192 which in turn fits into the gas aperture 190 at the male end 196 of the adapter 192.

Left or right fasteners such as pins, screws, bolts or rivets 198 fit into apertures 200 oppositely opposed on the rear cylindrical margin 172 and pass into the attachment holes 166 in the nozzle 140 to attach the nozzle gas cover 170 to the nozzle 140.

The gas cover 170 and accompanying inert gas structures may be omitted when the torch 100 is used in an inert environment such as a welding box, glove box or the like. Additionally, circumstances where a relatively clean vacuum is available (as in orbit) may allow the omission of the gas cover 170. Under such circumstances, the sensor probe 220, if any, should be attached to the nozzle 140 or other torch structure.

Additionally, a power connector 210 is attached to the nozzle gas cover 170 by one of the pins 198. As shown in FIG. 1, the pin or screw 198 attaching the power connector 210 to the gas nozzle cover 170 is the left pin or screw 198. The power connector 210 has attached to it a power connector clamp 212, which is held in place by a screw or bolt 214. The screw 214 additionally holds in place a proximity switch probe 220, which serves to detect the presence of a welding object or workpiece in front of the operating front apertures 144, 176 of the nozzle 140 and nozzle gas cover 170, respectively.

Figure 4:
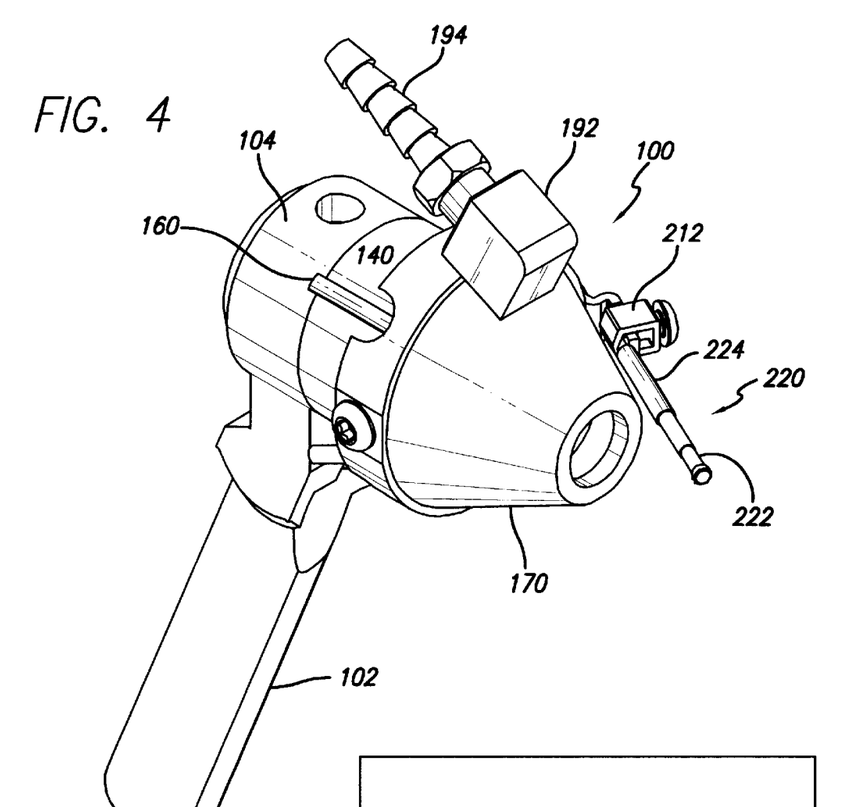
FIG. 4 is a right side perspective view of the hand held powder-fed laser fusion welding torch of FIG. 1 shown as assembled.

The proximity probe 220 may be spring biased so that the extending proximity switch 222 is biased forwardly outwardly from the proximity holder sleeve 224. The probe 220 is held in connection to the power connector 210 by the power connector clamp 212 and the connector screw or bolt 214. The workpiece or object will overcome the spring biasing of the proximity switch forcing it to travel into the proximity holder sleeve 224 and thus activating or enabling activation of a power connection for the laser welding torch 100. The entirety of the welding torch 100 is shown assembled in FIG. 4.

Figure 2:
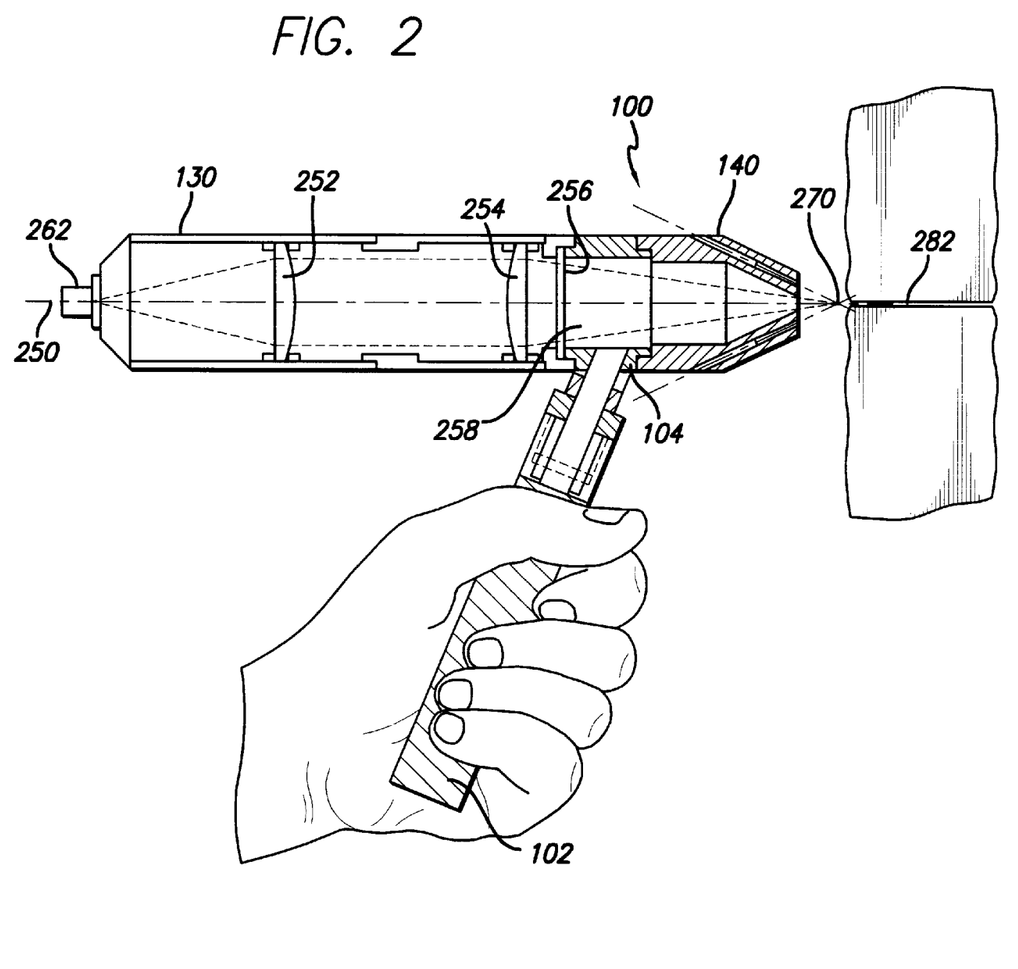
FIG. 2 is a right side cross-sectional view of the hand held powder-fed laser fusion welding torch of FIG. 1 with an, optical collimator and without the nozzle gas cover.

FIG. 2 shows the laser torch 100 with the attached optical beam delivery assembly 130. The optical beam delivery assembly 130 serves to take incoming laser light 250 and focus it immediately in front of the front aperture 176 of the nozzle gas cover 170. The optical beam delivery assembly 130 is generally made of optically inert material so that it will not be affected by laser light or the like. The optical beam delivery assembly 130 receives the laser light 250 and initially passes the light through a first collimator. The optical beam delivery assembly 130 has a first focusing lens or collimator 252, which may be a 60 mm collimator. The first collimator 252 generally takes the incoming laser light and refracts it so that it travels parallel to the interior and generally cylindrical inner surface of the optical collimator 130. The parallel-traveling light then shines upon a focal lens 254, which may be a 90 mm focal lens. The focal lens 254 then focuses the parallel-traveling light to a point immediately in front of the front aperture 176 of the nozzle gas cover 170.

The first collimator 252 and the focal lens 254 are spaced inside the optical collimator 130 so as to effectively provide light gathering and focusing qualities with the first collimator 252 generally spaced away from the incoming laser light 250, at a distance approximately equal to the focal length of the first collimator lens 252. The focal lens 254 is then located near the end of the optical beam delivery assembly 130 opposite that of the incoming laser light 250. As the focal lens 254 is protected by a lens protector 256, it is spaced apart from the light-exiting end 258 of the optical collimator 130.

Note should be taken that the beam delivery assembly 130 with its optimal collimating and focusing properties can serve to focus the focal point of the laser light at, beyond, or before the focal point of the powder flow and that these two focal points may be disposed selectively with respect to the end of the nozzle 140. Under certain circumstances, it may be more advantageous to provide different focal points for the laser light and the powder flow. Generally, these focal points would be collinear with the major axis of the laser torch 100. However, the present invention could provide alternative embodiments where such focal points are not collinear.

In the most preferred embodiment, no dispersion or absorption of the incoming laser light 250 occurs throughout the optical collimator 130 or the welding torch 100 in order to provide higher efficiency and so that as much as the incoming laser light 250 is focused upon the working focal point 270. Minimal dispersion of the laser light is desired most as the most energy generated and imparted to the laser light is then delivered to the welding site.

Preferably, only the incoming fusion powder traveling through the powder flow tubes 160 and the powder flow channels 152 obstructs or occludes the focused laser light 250 upon exiting the nozzle. The powder flow tubes 160 and powder flow channels 152 share the same nominal working focal point 270 as the laser light 250. The exact location of the laser light and powder flow focal points can be adjusted independently in order to optimize the laser and powder interaction characteristics. The energy of the laser light is then focused upon the fusion powder and whatever working surface is set before the open front end 176 and the nozzle gas cover 170.

To provide for such independent adjustment of the laser and powder, the body 104 of the torch 100 may be interchangeable and provide a selectable variety of diameters and lengths as appropriate or useful for the welding activities, as indicated above.

Additionally, in order to provide for higher transmission of the laser light, anti reflection coating may be present on the lenses through which the laser light 250 passes. Furthermore, the focusing lens 254 may be subject to possible threaded adjustment so that the focal point of the laser light may be adjusted manually and spontaneously by the welder. Such threaded adjustment may take the form of an adjustment screw that moves a carriage on which the focusing lens 254 translates.

In operation, laser light is supplied as by optical fiber or the like to the light receiving end 262 of the optical beam delivery assembly 130. The laser light is then focused simultaneously with the fusion powder on the working focal point 270. The energy of the laser light is sufficient to melt the fusion powder and, preferably, also at least some surface portion of the workpiece object to be welded and adjoined with the laser liquefied fusion powder. It is then possible to perform welds or other construction operations on metals or other surfaces susceptible to laser welding.

While the laser welding torch 100 can be used without fusion powder, the conjunctive use of the fusion powder with the laser light 250 provides means by which repairs, seams and other constructive welding activities may be performed on metal objects or objects of other laser-susceptible materials.

In operation, the barb-to-pipe conduit 194 snugly and by means of friction fit receives an outlet connected to a supply of inert gas, such as the noble gas argon. Argon gas is then used to flood the plenum 186 as the front nozzle portion 184 is slightly offset from the interior of the nozzle gas cover 170 in order to provide a frustro-conicular pathway for the inert gas to flow into the area between the nozzle 140 and the nozzle gas cover 170 and into the plenum 186.

Inert gases are used in order to prevent the unintentional combination of molecules in the bleed and nozzle flow gas with the welding site. Such inert gases are known in the art and may be similar to those used in TIG (tungsten inert gas) welding (also known as GTAW or gas tungsten arc welding). Inert gases generally have the quality of not combining with other materials or molecules. Helium is one predominately-used inert gas and is a noble gas, as is argon. However, nitrogen may also be used as inert gas under some circumstances.

Additionally, if the welding site is to be doped or intentionally contaminated with substances beyond the substrate or the feed powder, the gas transport system may serve to deliver some doping compounds or molecules into the welding site. Some experimentation may be necessary with this embodiment, however, controlled oxidation, such as by the introduction of oxygen into the inert gas, may be desirable under such circumstances. Other gases could also be introduced into the inert gas flow in order to provide such intentional alteration of the chemical structure at the weld site.

By the application of non-reactive inert gas, the powder and working surface subject to the incoming laser light 250 is kept from oxidizing or otherwise combining with anything but the surrounding material. Free oxygen or other gasses in the immediately adjacent environment close to the working focal point 270 are displaced by the inert gas. This allows a greater amount of control with respect to the welding of the workpiece object and/or the fusion powder. It also diminishes combustion, oxidation, and the likelihood thereof and provides for a better welding operation as only the materials sought to be welded are made liquid or soft by the energetic incoming laser light 250.

By providing a hand-held powder-fed laser fusion welding torch as set forth herein, laser welding operations now become much easier for the aerospace mechanic or other metal worker. Additionally, with the availability of intense laser light via fiber optic cables as well as fusion powder in connection with the powder feed tubes 160, the welding torch provides more useful means by which welding operations may be achieved.

Figure 5:
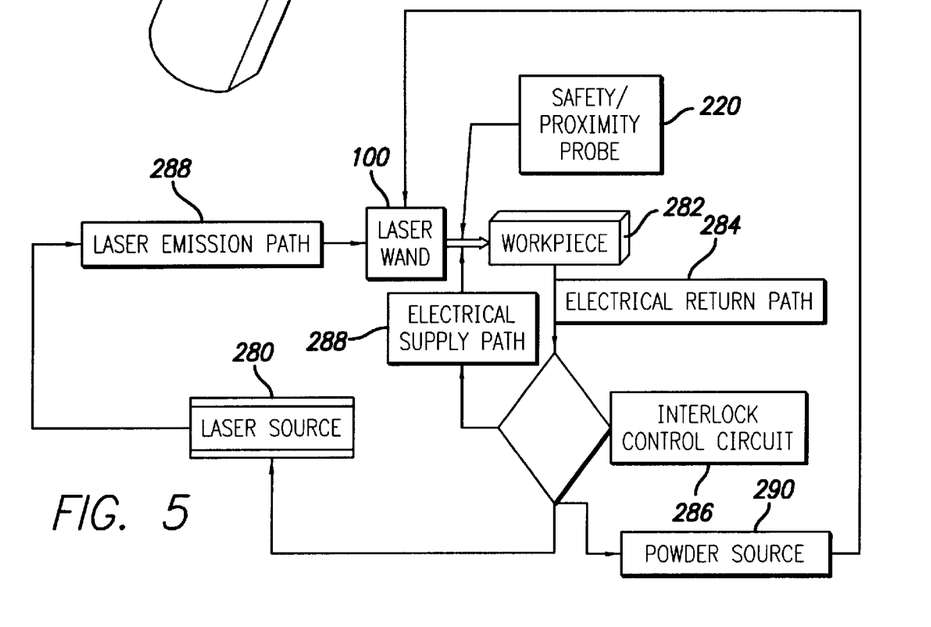
FIG. 5 is a status/control diagram for the proximity sensor system.
Figures 6, 7:
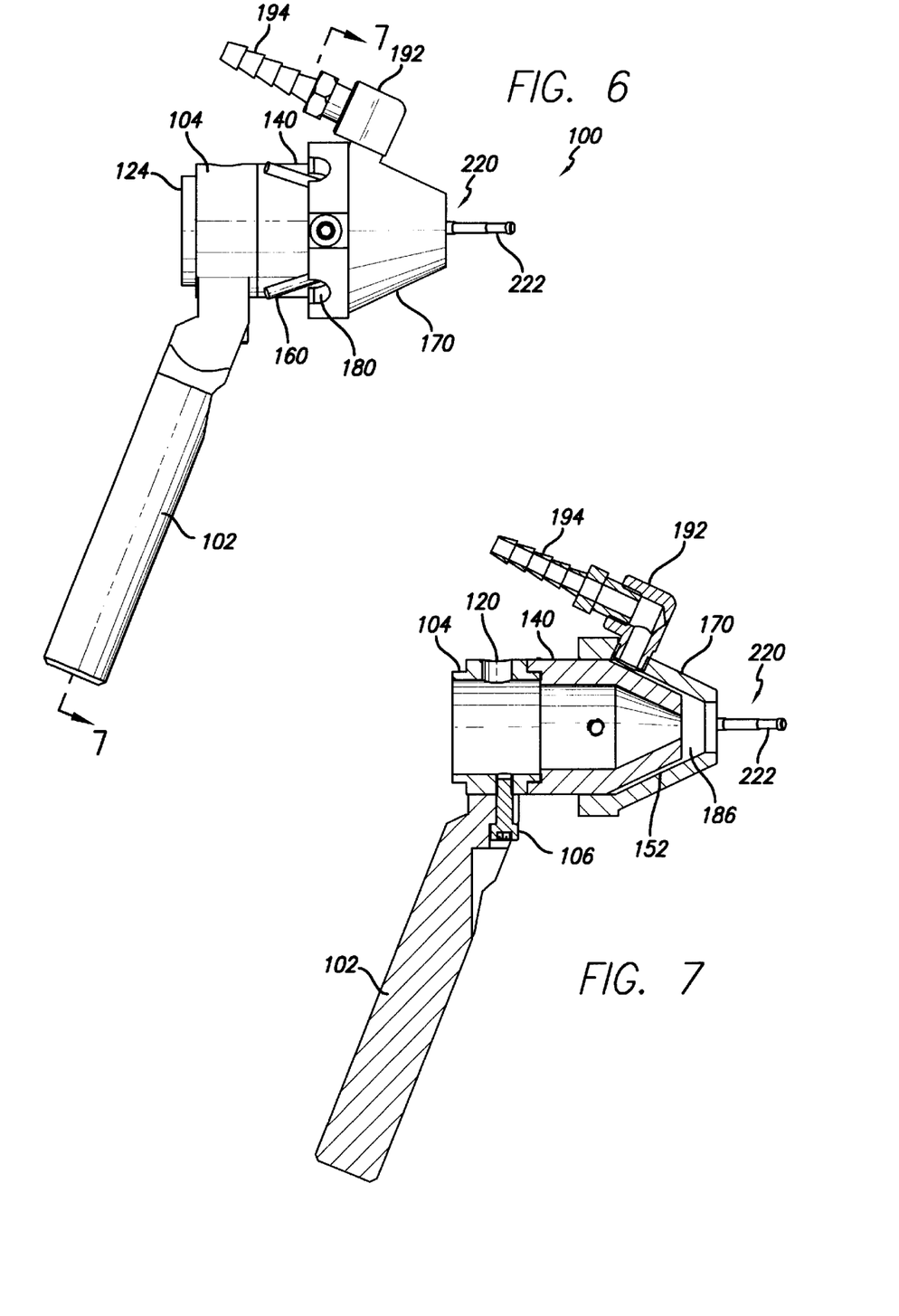
FIG. 6 is a right side plan view of the hand held powder-fed laser fusion welding torch of FIG. 1.
FIG. 7 is a right side cross-sectional view of the hand held powder-fed laser fusion welding torch of FIG. 1 taken along line 7—7 of FIG. 6.

Similar to that as shown in FIG. 5, the proximity probe 220 may operate in conjunction with the laser source 280 in order to provide automatic switching operation according to the proximity of the workpiece 282. In one embodiment, wiring is connected to the power connector 210, and the proximity switch 222 then enables activation of the laser source 280 once sufficiently depressed into the proximity holder 224.

Generally, the proximity switch 222 only enables activation and does not serve to actually activate the torch 100 unless it is the last element in the activation mechanism. The activation of the proximity switch 222 is a necessary, but not a sufficient, condition for the operation of the torch 100. The activation of the proximity switch 222 is necessary because it must be activated in order in order for the torch 100 to operate. However, the proximity switch 222 is not a sufficient condition as it alone is not able to activate the torch 100. A hand held trigger or the like (not shown) may also be used in conjunction with torch 100 in order to provide additional control for the welder over the torch 100.

Alternatively, and as shown in FIG. 5, if the workpiece is electrically conductive, an electrical return path 284 may be established via an interlock control circuit 286, which controls electrical supply via an electrical supply path 288. With the closure of the electrical circuit via the safety probe 220, electrical return path 284, interlock control circuit 286, and electrical supply path 288, the interlock control circuit 286 will detect that the laser torch or laser torch 100 is in sufficient proximity to the workpiece 282 such that the laser torch 100 should be activated by the activation of the laser source 280. The interlock control circuit 286 upon detecting a closed circuit path may enable activation of the laser source 280 so that laser light sufficient to perform welding operations may be transmitted via the laser emission path 288 to the laser torch 100. Furthermore, the interlock control circuit 286 may also control a powder source 290 in the form of a powder feed assembly or the like.

The powder feed assembly 290 may be similar to that as is known in the art. Powder for the melt is transmitted as by pumping or the like to the nozzle 140 for transmission through the powder flow channels 152. A source or reservoir for the alloy powder may be kept at a distance from the laser torch 100 and transmitted to the nozzle 140 by pressurized lines or the like.

Additionally, other types of sensors may be used in order to gauge the proximity of the torch 100, and the focal point, from the welding substrate. Such sensors included non contact sensors that may use induction, capacitance, or optical characteristics in order to gauge the distance of the torch 100 from the welding substrate. The torch 100 is contemplating as using to laser light having a wavelength of approximately 1.06 micrometers delivering energy sufficient to perform the welding activity set forth herein. The use of metal powder may subject a capacitive non-contact sensor to certain difficulties. Additionally, the heat and infrared energy generated by the torch may also provide optical difficulties for an optical non-contact sensor. However, certain other qualities may be used in order to provide non-contact sensors and/or these difficulties may be overcome due to the characteristics of the particular non-contact sensor. Additionally, other sensors developed in the future may be applied to the torch 100 and may provide advantageous proximity sensing so that they may be easily or advantageously incorporated into the torch 100.

Although not shown in FIG. 5, the interlock control circuit may also control the supply of fusion powder as well as the flow of inert gas to the laser torch 100.

The proximity probe or sensor 220 enhances operational safety through target discrimination and pointing constraints. It provides process control by defining or maintaining the correct working distance from the nozzle gas cover aperture 176 to the workpiece 282. The proximity sensor 220 may either provide physical limits of working distance, or in the case of a closed loop control system, provide distance feedback for an automatic working distance compensation apparatus. Additional feedback may be provided by the proximity sensor regarding relative positioning between the weld site and the torch 100. The proximity sensor 220 may provide audio and/or video feedback to the welder regarding such relative positioning. Moreover, the proximity sensor may provide sufficient feedback to allow the automatic adjustment of the laser light 250 and the powder flow.

The hand held laser welding torch 100 may include the integrated safety/proximity sensor 220 which has an electrically isolated contact probe 220 with a spring-loaded telescoping probe tip (available as an off the shelf component) 222 attached to the output end of the laser torch via the nozzle gas cover 170. The sensor 220 may be gold plated for better conductance. This probe, along with the metallic surface of the workpiece 282, forms an electrical path for a laser process shutter control circuit 280. In order to enable emission of the laser output, the safety sensor 220 must be both physically and electrically connected to the desired workpiece 282. In so doing, the workpiece itself must be isolated from ground and insulated from adjacent metal components. The relationship of the position of the safety probe 220 while in contact with the workpiece 282 defines the direction of laser emission and ensures that the correct target has been selected. An electrical return path 284 must be provided from the workpiece 282 to the laser process shutter control circuit 280. This is established through an electrical wire connection from the workpiece to the process control system. An alligator clip or equivalent clamp provides a suitable means for connecting to the workpiece.

Target discrimination is achieved by virtue of the required electrical contact as illustrated in FIG. 5. Laser emission is prevented unless direct electrical contact between the safety sensor probe 220 and the workpiece 282 has been established.

Process control of the torch-to-workpiece working distance is also provided in this apparatus. The proximity sensor probe 220 includes a spring loaded, telescoping tip 222. The range of movement of this tip defines the working distance as the operator manually follows the contours of the part. Alternate working distances and ranges of height tolerance are provided by a selection of interchangeable probe tips. Since the tip is easily replaced, new tips can be installed as needed due to normal wear and tear. Additionally, advances in laser-focusing and powder-feed technologies may allow the adjustment of the working focal point 270 according to the working distance detected by the tip 222.

In an alternate approach, a point contact linear variable displacement transducer (LVDT) may be used in place of the basic spring-loaded probe described above. The LVDT probe provides a source of electrical feedback proportional to its displacement. This signal may be used to actively control the laser and powder metal deposition systems to maintain a predetermined distance between the torch 100 and the workpiece 282 through a closed-loop feedback system interfaced with motorized lens and powder nozzle position actuators.

In another approach, one or more non-contact sensors may be attached to the welding torch 100 to provide safety discrimination and position sensing. The advantage of this approach lies in the high degree of flexibility and dexterity provided by a non-contact system. Access to a wider range of workpiece component shapes and configurations are possible compared with the point contact sensor.

Candidate sensors may be based on, but not necessarily limited to optical, capacitive, inductive or video technology. Combinations of more than one type of sensor may be necessary in order to provide the necessary degree of part discrimination and displacement resolution. The non-contact sensor technologies may be used with either manual operator or automatic closed loop control systems to maintain part distance requirements.

The hand held powder-fed laser fusion welding torch makes laser welding a manual process and no programming is necessary. It makes it easier to maneuver the laser output wand/torch into hard to reach places such as nozzles with curvatures. This feature allows for three-dimensional (3D) welding in random locations. Most existing laser welding systems are two dimensional (2D) and are limited due to automatic programming requirements with minimal x-y movements such that they cannot handle much variation between parts.

In the hand held powder-fed laser fusion welding torch, the laser beam and powder are focused outside of the nozzle. This helps to prevent the nozzle exit from clogging.

Shielding inert gas is used to protect the powder and substrate from contamination (i.e., oxidation) by removing oxygen and other reactive gases from the weld area. A lightweight design makes the laser torch ergonomically correct, easy to use and maintain. YAG laser use fir with fiber optic cable creates the flexibility provided by using the hand held torch while delivering the laser beam to the weld area.

Proximity sensors allow welding to start at the focal point. The sensor is also used as a safety feature, to allow the laser beam start only when its focal point is close to the desired weld area. Inert carrier gas is used to deliver the powder to the focal point. This is to prevent any oxidation of the weld and powder. All details, or elements, of the nozzle assembly can be easily replaced. All components are easily screwed together.

In wielding or using the laser torch 100, a method is provided to manually laser powder fusion weld a workpiece in order to effect construction and/or repair. A hand held powder-fed laser fusion welding torch is provided that may be manually operated. In such manual operation, the torch generally enjoys significant degrees of spatial freedom so that the welder may dispose the torch in a variety and number of easily-achieved positions. In this way, the welder may conform his activities to the needs at hand and is preferably not limited by physical constraints of the laser torch.

The workpiece 282 may first be prepared as by solvent cleaning or the like to ensure that the workpiece is clean and ready for welding. Once prepared, the welding torch 100 is prepared for use with the source of laser light and source of fusion powder made ready. Depending on the construction of the welding torch 100, the proximity sensor 220 may be brought into contact with the workpiece 282. Once the welder is ready, a trigger (not shown) may be pressed to activate the welding torch 100 and the welding process upon the workpiece 282. Laser light and powder flow are then delivered by the laser torch 100 to the work site and the welding process is performed upon the workpiece.

While the present invention has been described with reference to a preferred embodiment or to particular embodiments, it will be understood that various changes and additional variations may be made and equivalents may be substituted for elements thereof without departing from the scope of the invention or the inventive concept thereof.

Particularly, the interchangeable nature of fasteners demands that the indication of one type of fastener or fastening herein is contemplated as enabling and disclosing all types of fasteners or fastenings that may be implemented to achieve all or part of the functionality of the disclosed type of fastener or fastening. For example, a bolt, screw, pin, rivet, or dowel may be interchangeable with one another as well as fastening as by welding. Likewise, other interchangeable elements, operations, or functions are contemplated as being similarly inclosed herein when one or more of such interchangeable or equivalent elements, operations, or functions are disclosed.

In addition, many modifications may be made to adapt a particular situation or material to the teachings of the invention without departing from the essential scope thereof. Therefore, it is intended that the invention not be limited to particular embodiments disclosed herein for carrying it out, but that the invention includes all embodiments falling within the scope of the appended claims.

What is claimed is:

1. A hand held powder-fed laser fusion welding torch for treating a workpiece, comprising:

a body;

a nozzle assembly mounted on the body, the nozzle assembly defining a central nozzle aperture through which gas and light, including laser light, may pass; and wherein the nozzle defines first and second powder flow channels aligned with a working focal point adjacent the central nozzle aperture, whereby fusion powder may be transmitted through the first and second powder flow channels for fusing by laser light transmitted through the central nozzle aperture.

2. A hand held powder-fed laser fusion welding torch for treating a workpiece as set forth in claim 1, further comprising:

a powder feed supply system coupled to the first and second powder flow channels and supplying the first and second powder flow channels with fusion powder.

3. A hand held powder-fed laser fusion welding torch as set forth in claim 1, further comprising:

the first and second powder flow channels being located in opposed positions and tapered.

4. A hand held powder-fed laser fusion welding torch as set forth in claim 1, further comprising:

first and second powder flow tubes respectively inserted into the first and second powder flow channels, the first and second powder flow tubes providing a conduit between a powder flow supply and the first and second powder flow channels.

5. A hand held powder-fed laser fusion welding torch as set forth in claim 1, further comprising:

the nozzle having a hollow cylindrical rear section attached to a hollow frustro-conicular front section;

the front section terminating in a flat toroidal face circumscribing the central nozzle aperture;

the first and second powder flow channels symmetrically emerging from the nozzle face;

entrances to the first and second powder flow channels located in the rear to section and adjacent the front section.

6. A hand held powder-fed laser fusion welding torch as set forth in claim 1, further comprising:

a nozzle gas cover attached to the nozzle;

the nozzle gas cover defining a cover aperture generally coaxial with the nozzle aperture;

the nozzle gas cover defining a gas inlet for introduction of gas, including noble gasses;

the nozzle gas cover generally spaced apart from but in close proximity to the nozzle so as to provide a shroud about the nozzle through which gas may flow before exiting through the cover aperture; whereby gas may be controllably introduced between the nozzle and the nozzle gas cover so as to provide a controlled environment through which laser light and fusion powder may pass on to the working focal point.

7. A hand held powder-fed laser fusion welding torch as set forth in claim 1, further comprising:

a handle, the handle being removably coupleable and positionable with respect to the nozzle.

8. A hand held powder-fed laser fusion welding torch as set forth in claim 1, further comprising:

a controller adapted to selectively provide light to the torch;

a proximity sensor coupled to the nozzle, the proximity sensor adapted to a workpiece when the nozzle aperture is adjacent the workpiece, the proximity sensor changing its signal state to the controller to activate the welding torch when the workpiece is in a predetermined position to selectively activate the welding torch when the workpiece is in the predetermined position.

9. A hand held powder-fed laser fusion welding torch as set forth in claim 8, further comprising:

the proximity sensor coupled to the workpiece and establishing a closed electrical circuit when the proximity sensor touches the workpiece, the closed circuit enabling activation of the welding torch and breaking of the closed circuit deactivating the welding torch.

10. A hand held powder-fed laser fusion welding torch as set forth in claim 8, further comprising:

a controller adapted to selectively apply light to the torch;

the proximity sensor comprising a switch that turns on when the workpiece activates the proximity sensor and turns off when the proximity sensor is deactivated, the switch turning on and off the welding torch according to the on and off state of the switch.

11. A hand held powder-fed laser fusion welding torch as set forth in claim 8, wherein the proximity sensor provides feedback regarding nozzle position.

12. A hand held powder-fed laser fusion welding torch as set forth in claim 11, wherein the proximity sensor further comprises:

a proximity sensor selected from the group consisting of contact and non-Patent contact proximity sensors.

13. A hand held powder-fed laser fusion welding torch as set forth in claim 11, wherein the proximity sensor further comprises:

a proximity sensor providing feedback for compensating for variations in a distance between the nozzle and the workpiece such that foci of laser light and powder flow are accommodated according to variations in distance between the nozzle and the workpiece.

14. A hand held powder-fed laser fusion welding torch as set forth in claim 11, wherein the proximity sensor further comprises:

a feedback circuit, said feedback circuit providing feedback to the welder selected from the group consisting of audio feedback and video feedback.

15. A hand held powder-fed laser fusion welding torch, comprising:

a nozzle defining a central nozzle aperture through which light, including laser light, may pass, the nozzle having a hollow cylindrical rear section attached to a hollow frustro-conicular front section, the front section terminating in a flat toroidal face circumscribing the central nozzle aperture;

the nozzle defining first, second, third, and oppositely opposed powder flow channels focused on a working focal point adjacent the central nozzle aperture;

the first, second, third, and fourth powder flow channels being tapered to promote the focused flow of powder to the working focal point;

the first, second, third, and fourth powder flow channels symmetrically emerging from the nozzle face;

entrances to the first, second, third, and fourth powder flow channels located in the rear section and adjacent the front section;

first, second, third, and fourth powder flow tubes respectively inserted into the first, second, third, and fourth powder flow channels, the first, second, third, and fourth powder flow tubes providing a connection and conduit between powder flow supply lines and the first, second, third, and fourth powder flow channels;

a powder feed supply system coupled to the first, second, third, and fourth powder flow channels and supplying the first, second, third, and fourth powder flow channels with fusion powder; and a proximity sensor coupled to the nozzle, the proximity sensor sensing a workpiece before the central nozzle aperture adjacent the working focal point, the proximity sensor enabling activation of the welding torch when a workpiece is sensed before the central nozzle aperture and disabling activation of the welding torch when a workpiece is not sensed before the central nozzle aperture; whereby fusion powder may be transmitted through the first, second, third, and fourth powder flow channels for fusing by laser light transmitted through the central nozzle aperture.

16. A hand held powder-fed laser fusion welding torch as set forth in claim 15, wherein the proximity sensor further comprises:

a nozzle gas cover coupled to the nozzle;

the nozzle gas cover defining a cover aperture generally coaxial with the nozzle aperture;

the nozzle gas cover defining a gas inlet for introduction of gas, including inert gasses; and the nozzle gas cover generally spaced apart from but in close proximity to the nozzle so as to provide a shroud about the nozzle through which the gas may flow before exiting through the cover aperture; whereby gas may be controllably introduced between the nozzle and the nozzle gas cover so as to provide a controlled environment through which laser light and fusion powder may pass on to the working focal point.

17. A hand held powder-fed laser fusion welding torch as set forth in claim 15, further comprising:

the proximity sensor coupled to the workpiece and establishing a closed electrical circuit when the proximity sensor touches the workpiece, the close circuit enabling activation of the welding torch and breaking of the closed circuit deactivating the welding torch.

18. A hand held powder-fed laser fusion welding torch as set forth in claim 15, further comprising:

the proximity sensor comprising a switch that turns on when the workpiece depresses the proximity sensor and turns off when the proximity sensor is extended, the switch turning on and off the welding torch according to the on and off state of the switch.

19. A hand held powder-fed laser fusion welding torch as set forth in claim 15, further comprising:

the proximity sensor being a non-contact proximity sensor.

* * * * *